May 23, 1961
E. B. McMILLAN
2,985,880
DIELECTRIC BODIES FOR TRANSMISSION OF
ELECTROMAGNETIC WAVES
Filed April 24, 1958
3 Sheets-Sheet 1
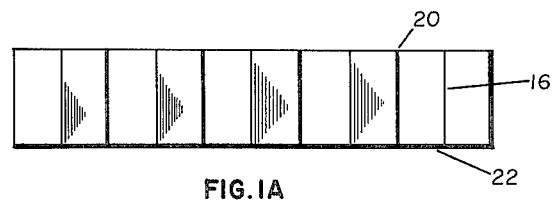
FIG. IA
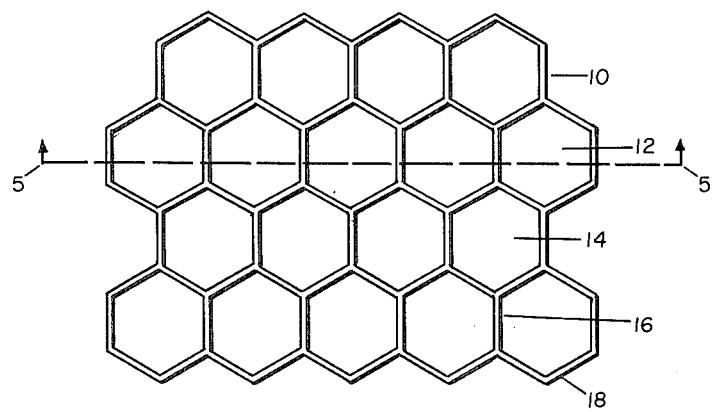
FIG. IB
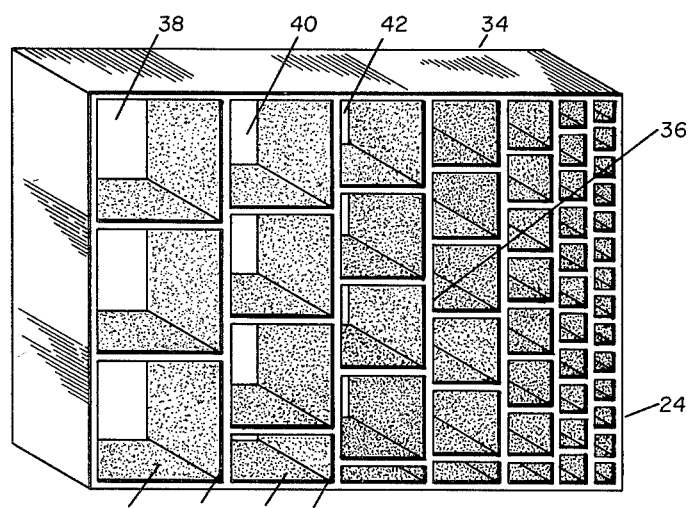
FIG. 2
INVENTOR.
Edward B. McMillan May 23, 1961  E. B. McMILLAN  2,985,880
DIELECTRIC BODIES FOR TRANSMISSION OF
ELECTROMAGNETIC WAVES
Filed April 24, 1958  3 Sheets-Sheet 2

INVENTOR
Edward B. McMillan

May 23, 1961

E. B. McMILLAN 2,985,880

DIELECTRIC BODIES FOR TRANSMISSION OF
ELECTROMAGNETIC WAVES

Filed April 24, 1958

INVENTOR.

Edward B. McMillan

United States Patent Office 2,985,880
Patented May 23, 1961

2,985,880
DIELECTRIC BODIES FOR TRANSMISSION OF ELECTROMAGNETIC WAVES

Edward B. McMillan, Ipswich, Mass.
(Perkins Row, Topsfield, Mass.)

Filed Apr. 24, 1958, Ser. No. 730,594

18 Claims. (Cl. 343—910)

This invention relates to dielectric bodies for transmission of electromagnetic waves, and particularly to new types of dielectric lenses and prisms which may provide both high strength and light weight together with desirable refractive properties. This is in part a continuation of my application Serial No. 430,388, filed May 17, 1954, and entitled "Dielectric Bodies for Transmission of Electromagnetic Waves," which matured into Patent 2,840,811 on June 24, 1958.

Dielectric walls for transmission of electromagnetic waves have in general been in the form of dielectric sheets or laminates selected as to material and formed as to shape to provide transmission of electromagnetic waves with minimum or controlled distortion. Sometimes such bodies have been either too heavy or too weak for certain uses. Efforts to provide a lightweight dielectric sheet have resulted in the production of foamed resin sheets carrying loadings of metallic particles dispersed throughout them. Such loaded dielectric sheets have often been unsatisfactory for uses demanding great precision because of the inherent difficulty of securing and maintaining an even distribution of metallic particles during the process of expanding the resin. That is, some portions of the resin expand more than other portions, or in a different manner, so that the distribution of metallic particles carried by the resin often becomes uneven. In addition, the dielectric constants and hence, the electrical thicknesses, of such foamed sheets may vary rather widely, and there has been no available satisfactory means for adjusting the dielectric constant and electrical thickness of a foamed sheet to bring them to desired values. These difficulties have been compounded in instances where it is desired to fabricate a lens or prism of varying dielectric constant or electrical thickness, and where maintenance of a closely controlled variation of dielectric constant or electrical thickness is essential. Further difficulties have been encountered in the provision of sufficient structural strength to bodies for the transmission of electromagnetic waves without at the same time introducing electrical discontinuites which distort the phase or amplitude of the electromagnetic waves.

Therefore, it is an object of this invention to provide new dielectric bodies characterized by a high degree of uniformity and capable of being adjusted to a desired variable dielectric constant or electrical thickness, or both.

It is a further object of this invention to provide new types of dielectric bodies having high strength in combination with light weight and satisfacory electrical continuity, and capable of fulfilling with desired precision the functions of lenses or prisms for electromagnetic waves.

Briefly, these and other objects of this invention have been fulfilled by supplying a dielectric body capable of simulating a state of dielectric continuity but in which the desired apparent dielectric constant of the body is secured by the provision of a multitude of partition walls disposed at a high angle with the wave front of the electromagnetic waves impinging upon the body. These partition walls have distributed thereon a great many particles which impart to the partition walls a dielectric constant much higher than that of the walls themselves and permit the over-all dielectric body, including the void spaces between the partition walls, to assume a desired apparent dielectric constant. The particles distributed on the partition walls may conform to previously determined distribution standards or gradients in order to provide either a fixed or variable dielectric constant along the walls. If the particles on the walls are conductive, they should be distributed sufficiently sparsely to be substantially electrically insulated from one another. The electrical thickness of various portions of the body may be controlled either by distributing the particles according to predetermined gradients on the partition wall or by controlling the lengths of the cells defined by the partition walls of the body, or by both of such techniques.

A more complete understanding of this invention may be derived from the following detailed specification read in conjunction with the several figures of the drawings, in which Figure 1A is an orthogonal view of the edge of a honeycomb structural member capable of serving as the physical foundation for a dielectric body constructed in accordance with this invention;

Figure 1B is an orthogonal view of the face of the honeycomb structural member of Figure 1A;

Figure 2 is an isometric view of a dielectric wedge or prism constructed in accordance with this invention;

Figure 7:
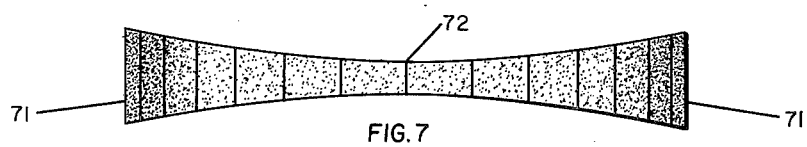
Figure 8:
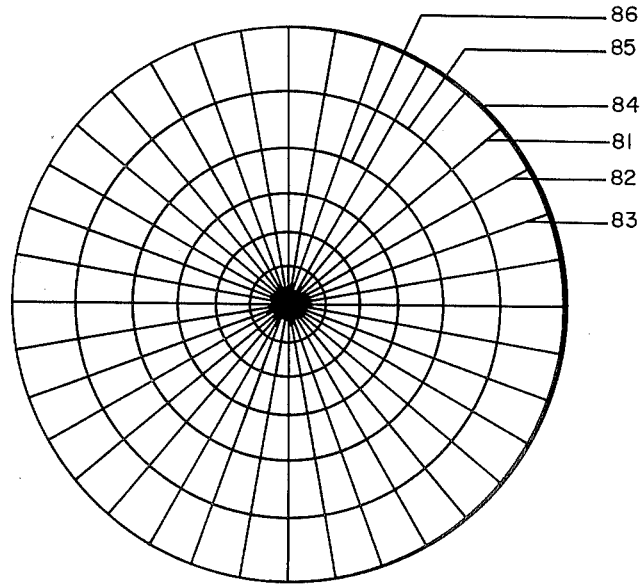

Figure 7 is a sectional view of a double-concave lens according to my invention, where variation in electrical thickness is achieved both through control of density or recurrence frequency of partition walls and also by controlling the lengths of the cells defined by these walls; and Figure 8 is a plan view of a circular lens according to my invention, in which the partition walls include both radial and circumferential walls for the definition of the cells in the lens.

Turning to Figures 1A and 1B of the drawings, one may observe a honeycomb structural member suitable for use in a dielectric body constructed in accordance with the present invention. A regular supporting structure 10 composed of repeating cells, such as 12 and 14, of substantially uniform size and configuration and of dielectric material provides partition walls typified by 16 and 18 defining cells of hexagonal cross-section, said cells extending normal to wave-receiving faces such as 20 or 22. The cells, such as 12 and 14, have a cross-sectional area, taken in a plane parallel to faces 20 or 22, of a size less than the cut-off cross-section of a wave guide for electromagnetic waves of the frequency to be transmitted by the dielectric body according to this invention. By making the cross-section of the cells less than ¼ of the square of the wavelength of the electromagnetic waves to be transmitted, waveguide action by the cells is avoided. A high over-all dielectric constant is provided by distributing along the walls of cells such as 12 and 14 metallic or dielectric particles. If the particles are metallic, they should preferably be in electrically insulated relation with one another. Since cells such as 12 and 14 are disposed at a high angle with faces 20 and 22, the dielectric body so far described possesses electrical characteristics which have artificially been made uniform. Since control of the distribution of metallic or dielectric particles on the partition walls is relatively easy, it is relatively easy to secure a desired over-all uniform dielectric constant. One way to maintain this uniformity of distribution of particles is by "loading" the strip material of which the honeycomb structure is composed, before the strip material is assembled to form the honeycomb. The particles may be applied to the surface of the strip material by painting or spraying or any other suitable method, or may actually form part of the strip rather than appearing on its surface.

Figure 3:
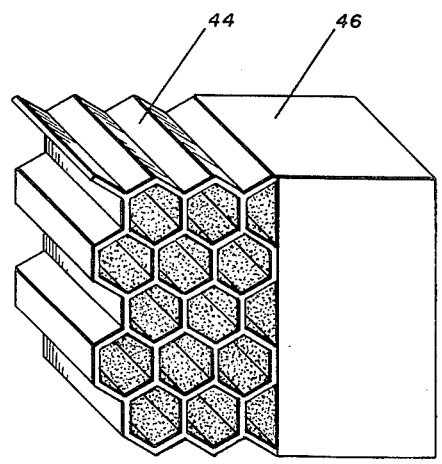
Figure 3 is an isometric view of a composite dielectric body comprising a loaded honeycomb structural member, such as is shown in Figures 1A and 1B, abutting a solid dielectric material which may lend structural support to the honeycomb member.
Figure 4:
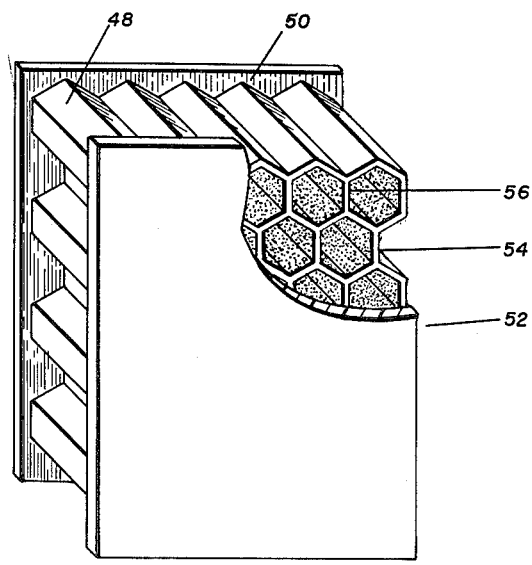
Figure 4 is an isometric view with a cut-away section showing a composite dielectric body comprising a loaded honeycomb structural member sandwiched between two solid dielectric walls which may support and protect the honeycomb.

While the body fabricated in this manner simulates a solid, continuous, homogeneous dielectric, the weight of the body can be much less than that of an equivalent solid dielectric because the cells may be left open or may, if desired, be filled with some very light material. In addition, inasmuch as the walls of the cellular dielectric structure may be very strong, high over-all strength can be secured together with the previously mentioned low density. Since the dielectric body of Figures 1A and 1B, loaded with particles as described, simulates a continuous dielectric material, it may be employed in composite dielectric constructions together with solid dielectric bodies placed against its surfaces or edges. Such composite dielectric constructions, which may substantially avoid electrical discontinuity despite their composite nature, are illustrated in Figures 3 and 4 of the drawings and typify ways in which the strength of cellular dielectric material can be still further augmented.

So far in this specification, I have described a dielectric body having over-all uniform electrical characteristics. According to my invention, these electrical characteristics can be varied in order to secure desired variations of dielectric constant and electrical thickness. These variations are achieved by varying the lengths or the cross-sectional areas of the cells of the dielectric material or by applying the loading particles according to a predetermined gradient or by combinations of these techniques, depending upon the desired physical and electrical properties to be obtained.

In one example of the structural material which is adaptable by any or all of these means, the cells such as 12 and 14 defined prisms having a depth of 0.270" and cross-sectional areas which were equilateral hexagons having a width of 0.144" on each side. The walls, typified by 16 and 18, were 0.015" thick and were built up from strips of fiberglass fabric rigidified and fastened together by a cured phenolic resin and covered on both sides by a 0.0045" thick cured coating of the following mixture:

Polyester-styrene resin, 100 weight parts
Benzoyl peroxide catalyst, 4.5 weight parts
Extra-fine aluminum lining powder, 25 weight parts.

The concentration of uniformly-distributed electrically-insulated metallic particles in this coating imparted to the walls typified by 16 and 18 a sufficiently high dielectric constant so that the measured dielectric constant of the dielectric body in its entirety was 5.32 at 5000 megacycles per second. It possessed the following mechanical strength properties normal to its faces 20 and 22:

Ultimate compressive strength, 609 p.s.i.
Ultimate shear strength, 445 p.s.i.
Ultimate shear modulus, 21,800 p.s.i.
Tensile strength, 488 p.s.i.

The density of this sample was only 7.75 pounds per cubic foot.

Figure 5:
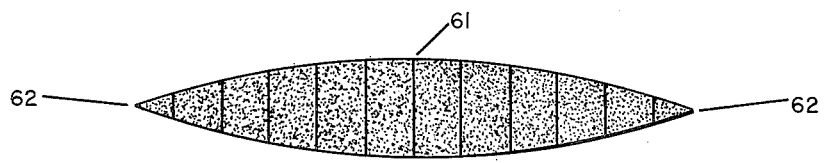
Figure 5 is a sectional view, taken along the line 5—5 of Figure 1B and showing a double-convex lens which may be fabricated from honeycomb material of the type shown in Figure 1B.

When a sample as described above is machined to have a cross-section as shown in Figure 5, the dielectric body as described becomes a double-convex lens capable of focusing electromagnetic radiation. In the lens of Figure 5, the electrical thickness is high near the center 61 of the lens and tapers toward the peripheral edges 62. It will be understood that electrical thickness is a function both of dielectric constant and of physical thickness and is a measure of the phase angle between an electromagnetic wave emerging from the body after having passed through it, and an electromagnetic wave from the same source reaching the same point without having passed through the body. In the previous illustration, the particles used for loading purposes were of finely divided aluminum. If desired, particles of other metals could be used, or semi-conductive materials such as carbon could be used. Alternatively, if it is desired to impart a very high dielectric constant to the cell walls, materials such as finely divided titania, barium titanate or calcium titanate might be employed. A still further alternative material for use in cases where magnetic properties are not objectionable is any of various so-called "ferrite" materials, which are processed aggregates of various metallic oxides.

Figure 6:
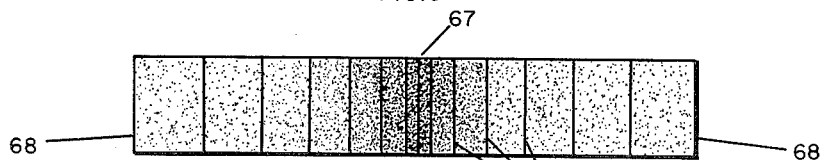
Figure 6 is a sectional view of an electrically convex lens in which the electrical thickness at the central portion of the lens is increased over that at its periphery by at least an increase in the density or recurrence frequency of partition walls.

A convex lens similar in electrical properties to that shown in Figure 5 can be achieved as illustrated in the sectional view of Figure 6. In this lens, the lengths of the cells defined by the partition walls, such as shown at 65, are uniform rather than being tapered as shown in Figure 5. However, the varying electrical thickness is achieved by varying the cross-sectional areas of the cells, spacing the cell partition walls more closely near the center 67 than at the edges 68 and thus securing cells having smaller cross-sectional areas near the center of the lens than at its edges. A similar effect could be achieved by loading the surfaces of the cell walls more densely near the center of the lens than at its edges. The gradient expressing the variations in surface density of loading may be linear from the center toward the edges of the lens or may follow exponential or logarithmic curves or any other contour which is desired in order to secure certain refractive properties.

In Figure 7 is illustrated a double-concave lens in which the electrical thicknesses at the edges 71 are higher than near the center 72 because the lengths of the cells near the edges are greater than near the center and because the partition walls are spaced closer together near the edges than at the center, thus defining cells of smaller cross-sectional area. The desired electrical effect in the lens of Figure 7 has been achieved by a combination of control over the lengths of the cells and control over the cross-sectional areas of the cells. It will be appreciated that, if desired, the electrical properties could be changed or enhanced by controlling also the surface density with which the particles are applied to the walls of the cells. Alternatively, this technique of controlling the surface density of application of the particles could be combined with the technique of either controlling the length or the cross-sectional area of the cells. Still another technique offering a means of control of electrical properties is to choose a loading material having a dielectric constant such that, when spread upon the cell wall surfaces, the over-all dielectric constant will be that which is desired. It will be understood that these techniques for designing bodies to control electromagnetic waves are not limited in their utility to any particular band such as the microwave band. While the microwave band naturally seems to supply many occasions for application of these techniques, the techniques can also be applied with electromagnetic waves having frequencies either above or below the range which has come to be designated as the microwave band.

Moreover, in all these refractive bodies, it is apparent that the directions of some portions of the electromagnetic waves will depart widely from parallelism with the cells.

In Figure 2 is illustrated a dielectric wedge or prism constructed in accordance with this invention. A cellular supporting structure 24 composed of repeating cells, such as 26 and 28, of uniformly varying size and configuration and of dielectric material provided partition walls typified by 30 and 32 defining cells in the form of rectangular prisms normal to wave-receiving faces 34 or 36. The cells, such as 26 and 28, had cross-sectional areas, taken in a plane parallel to faces 34 and 36, of sizes less than wave-guide cut-off size for electromagnetic waves of the frequency to be transmitted by the prism. Thus, waveguide action would not take place in the prism. The cell walls 30 and 32 were constructed with material similar to that of the cell walls 16 and 18 shown in Figures 1A and 1B, and coated in the same way with distributed dielectric particles or electrically-insulated metallic particles. The particular sample illustrated in Figure 2 had its cells filled with polyethylene. In the cellular supporting structure 24 comprising adjacent columns such as 38, 40 and 42 of successively smaller prisms, the dielectric constant and electrical thickness of the dielectric wedge increased in the direction in which the cross-sectional area of the cells decreased. Thus, this dielectric body of uniform physical thickness constituted a body having electrically the properties of a wedge or prism and capable of shifting the path of propagation of electromagnetic waves toward the direction of decreasing cell size. Once again, the curve of cell cross-sectional area as a function of distance along the base of the body could be linear or could have any desired configuration in order to secure particular refractive properties. That is to say, waves passing through the wedge body would be refracted toward the end of the wedge at which the cells have the smallest cross-sectional areas, and the amount of such refraction at any particular point in the wedge depends upon the way in which the gradient of cell cross-sectional area is chosen.

In the sample illustrated in Figure 2, the loading of the cell partition walls was uniform, and the variation of electrical thickness was achieved by control of the cross-sectional areas of the cells. As was the case with the lenses described in the foregoing paragraphs, the variation of electrical thickness could be achieved or enhanced by varying the surface density of loading of the cell walls. Such variable loading could be achieved by carefully controlling the application of the loading particles by means of a spraying or brushing operation. In the case of cellular structural material such as illustrated in Figures 1A and 1B, a loading gradient could be achieved in the horizontal direction by depositing prior to assembly of the cellular structure, a loading on the strips to be assembled into such cellular structure, said loading being characterized by a triangular gradient or a gradient in accordance with any other desired curve. This technique assumes that the cell walls which constitute each roughly horizontal line in Figure 1B are a single strip which could be preloaded before assembly. Still another type of gradient which could be applied is a gradient normal to the length of the strips, so that, after assembly of the honeycomb material, the loading density near one face of the honeycomb will differ in a desired fashion from the loading density near the other face of the honeycomb. Once again, the loading material could be chosen from dielectric powders or from conductive powders in which the particles are not in contact with one another. Finely divided carbon is a commonly used loading material and serves very satisfactorily so long as it is not used in excessive quantities. Once again, the loading material could be within the walls as well as on their surfaces.

In Figure 3 is illustrated in isometric view the honeycomb dielectric body 44, built up using material similar to that shown in Figures 1A and 1B, abutting a solid dielectric material 46 which may have the same dielectric constant and thickness as the loaded honeycomb. In the past, a dielectric wall comprising a low-density body contiguous at its edge with a solid dielectric body would ordinarily have caused diffraction and phase-front distortion in an electromagnetic wave entering its wave-receiving face. This fact has hampered the construction of practical reinforced or joined dielectric walls for the transmission of electromagnetic waves. However, when the low-density body, e.g. a loaded honeycomb material, and the solid body are designed so as to have the same dielectric constant as well as the same thickness, diffraction and phase-front distortion are drastically reduced. Thus it becomes possible to combine a light-weight honeycomb material with a strong, solid dielectric member to help support the honeycomb, and to achieve such a combination without at the same time introducing serious electrical discontinuity.

In Figure 4 is illustrated in isometric view a cut-away section showing the honeycomb dielectric body 48 like that of Figures 1A and 1B, sandwiched between two solid dielectric walls 50 and 52 having substantially the same dielectric constant as the honeycomb body and placed contiguous with its faces 54 and 56. The sample illustrated in this figure behaved effectively as a single dielectrically homogeneous panel with respect to electromagnetic waves received through either of its faces. From an electrical viewpoint, the relative thicknesses of the walls 50 and 52 and the honeycomb dielectric body 48 were unimportant as long as the total thickness of the combined body remained the same. Such a combination provides substantial independence of structural design variables from electrical design variables, permitting the reinforcement and protection of a honeycomb or similar light-weight material without at the same time losing much of the advantage of light-weight or introducing electrical discontinuities.

Still another possible configuration of microwave lens is that which is shown in Figure 8, in which a number of radial partitions 81, 82, 83, etc. are assembled with a number of circumferential partitions 84, 85, 86, etc. to define a cellular body in which each cell with the exception of the cells inside the innermost circumferential partition has a segmental cross-section. As the number of partitions of both types increases, the cross-section of each such cell approaches more and more closely to a rectangle. In the lens shown in Figure 8, the variations necessary in order to achieve the desired electrical properties may once again be made by varying the length or cross-sectional area of the respective cells or by varying the surface density of the loading material applied to the cell walls. Inasmuch as the symmetry of the lens of Figure 8 is circular, the natural procedure is to vary the design parameters mentioned according to a gradient running from the central point of the lens to its periphery. Once again, a combination of techniques may be employed. For instance, the lens of Figure 8 might have the lengths of its cells machined until its cross-section becomes that which is illustrated in Figure 5, and the cross-sectional areas of the cells might increase from the center toward the periphery as shown in Figure 8. The use of these two techniques together would result in a convex lens, electrically as well as physically. In view of the divergence of the radial partition walls, an increase in cross-sectional area of the cells from the center toward the periphery is natural but may be accentuated by increasing the distances between successive pairs of circumferential partitions as one goes from the center toward the periphery. It will be understood that ordinarily the usable portion of the lens will be that portion within the peripheral line at which the cross-sectional area of the cells becomes substantially equal to one-fourth of the square of the wavelength of the electromagnetic radiation to be employed. By making the circumferential partitions conform to a shape which is frusto-conical instead of cylindrical, a variation in effective dielectric constant can be achieved in the direction parallel to the axis of the lens. It is apparent that a circular lens of a type shown in Figure 8 can be designed to be a diverging lens instead of the converging lens which has been used as an example.

For the purpose of describing my invention, certain specific embodiments and materials have been illustrated, but it is to be understood that the breadth of the invention is to be limited only by the scope of the claims appended hereto. For instance, although the discussion of the various embodiments of my invention has dwelt heavily on the types of dielectric bodies which transmit the greater part of the energy impinging thereon, it will be understood that use of at least semi-conducting loadings will make these bodies lossy and will permit them to be used as attenuators or absorbers of electromagnetic energy. I can achieve bodies which have both absorptive and refractive properties that may vary in accordance with any desired gradients.

What I claim as new and desire to secure by Letters Patent of the United States is as follows:

1. A dielectric body for transmission of electromagnetic waves comprising a cellular structure in which the cells are oriented substantially parallel to the direction of propagation of said electromagnetic waves and in which the cross-sectional area of the cells normal to said direction of propagation is less than one-fourth the square of the wavelength of said waves, the walls of said cells bearing dielectric particles distributed upon the surfaces of said walls.

2. A dielectric body in accordance with claim 1 in which said distribution of dielectric particles is non-uniform from cell to cell.

3. A dielectric body in accordance with claim 1 in which said cross-sectional areas of said respective cells differ from one another in accordance with a gradient in a given direction.

4. A lens for transmission of electromagnetic waves, said lens comprising a cellular structure of radial partitions and circumferential partitions defining cells oriented substantially parallel to the direction of propagation of said electromagnetic waves, the cross-sectional areas of said cells normal to said direction of propagation being less than one-fourth the square of the wavelength of said waves throughout the usable portion of said lens, and the partitions of said cells bearing particles distributed on said walls.

5. A prism for transmission of electromagnetic waves, said prism comprising a cellular structure of tiers of cells, said cells being oriented substantially parallel to the direction of propagation of said electromagnetic waves and having cross-sectional areas normal to said direction less than one-fourth the square of the wavelength of said waves, the walls of said cells bearing distributed dielectric particles for control of the dielectric constant of said prism.

6. A prism according to claim 5 in which cells of any given tier have substantially equal cross-sectional area and cells of different tiers have cross-sectional areas which differ.

7. A composite dielectric wall for transmission of electromagnetic waves comprising at least one dielectric body in combination with a cellular structure in which the cells are oriented substantially parallel to the direction of propagation of said electromagnetic waves and in which the cross-sectional areas of the cells normal to said direction of propagation are less than one-fourth the square of the wavelength of said waves, the walls of said cells bearing distributed dielectric particles in substantially insulated relation with one another.

8. A composite dielectric wall according to claim 7 in which said dielectric body abuts said cellular structure in contact with the side walls of certain ones of said cells.

9. A composite dielectric wall according to claim 7 in which said dielectric body abuts an end portion of said cellular structure.

10. A composite dielectric wall according to claim 7 in which a dielectric body abuts each end portion of said cellular structure.

11. A composite dielectric wall according to claim 7 in which the dielectric constant of said dielectric body substantially equals the effective dielectric constant of said cellular structure bearing said distributed dielectric particles.

12. A lens according to claim 4 in which the distances between successive pairs of circumferential partitions are non-uniform, said distances increasing from the center toward the periphery of said lens.

13. A lens according to claim 4 in which the distances between successive pairs of circumferential partitions are non-uniform, said distances decreasing from the center toward the periphery of said lens.

14. A lens according to claim 4 in which the surface density of distribution of said particles on said cell walls is non-uniform, said surface density increasing from the center toward the periphery of said lens.

15. A lens according to claim 4 in which the surface density of distribution of said particles on said cell walls is non-uniform, said surface density decreasing from the center toward the periphery of said lens.

16. A lens according to claim 4 in which the lengths of said cells are non-uniform, said lengths of said cells increasing from the center toward the periphery of said lens.

17. A lens according to claim 4 in which the lengths of said cells are non-uniform, said lengths of said cells decreasing from the center toward the periphery of said lens.

18. A lens according to claim 4 in which said cross-sectional areas of said cells are non-uniform, said cross-sectional areas of said cells increasing from the center toward the periphery of said lens.

References Cited in the file of this patent

UNITED STATES PATENTS

| | | |
|---|---|---|
| 2,607,009 | Affel | Aug. 12, 1952 |
| 2,636,125 | Southworth | Apr. 21, 1953 |
| 2,716,190 | Baker | Aug. 23, 1955 |
| 2,840,811 | McMillan | June 24, 1958 |